United States Patent
Huang et al.

(10) Patent No.: US 6,967,836 B2
(45) Date of Patent: Nov. 22, 2005

(54) DEVICE FOR ACCOMMODATING A TABLET PC

(75) Inventors: Tzu-Lin Huang, Hsin-Tien (TW); Ming-Hsun Chou, Tao-Yuan (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 222 days.

(21) Appl. No.: 10/462,649

(22) Filed: Jun. 17, 2003

(65) Prior Publication Data

US 2004/0150628 A1 Aug. 5, 2004

(30) Foreign Application Priority Data

Jan. 30, 2003 (TW) ........................................ 92201939 U

(51) Int. Cl.[7] .............................................. G06F 1/20
(52) U.S. Cl. ...................................... 361/687; 361/683
(58) Field of Search ................................ 361/679–687

(56) References Cited

U.S. PATENT DOCUMENTS

| | | | | | |
|---|---|---|---|---|---|
| 5,552,957 A | * | 9/1996 | Brown et al. | ............... | 361/683 |
| 5,717,567 A | * | 2/1998 | Tao | ............................. | 361/683 |
| 5,738,325 A | * | 4/1998 | Brown | .................. | 248/346.01 |
| 5,857,568 A | * | 1/1999 | Speirs | ........................ | 206/320 |
| 6,163,450 A | * | 12/2000 | Kim | ........................... | 361/679 |

* cited by examiner

Primary Examiner—Yean-Hsi Chang
(74) Attorney, Agent, or Firm—Winston Hsu

(57) ABSTRACT

A device for accommodating a tablet computer includes a first sidewall plate and a second sidewall plate that is disposed corresponding to the first sidewall plate. The first sidewall plate and second sidewall plate define a space for accommodating the tablet computer. A supporting mechanism comprises a first pivot piece and a second pivot piece, both of which having one end being pivotally installed at an inner side of the first sidewall plate. The first pivot piece and second pivot piece rotate between a close position and an angled use position with respect to the first sidewall plate. When the first pivot piece and second pivot piece are in the angled use position, the second pivot piece is supported and positioned by the first pivot piece so that the second pivot piece can support the tablet PC.

13 Claims, 5 Drawing Sheets

DEVICE FOR ACCOMMODATING A TABLET PC

BACKGROUND OF INVENTION

1. Field of the Invention

The present invention relates generally to a device for accommodating a tablet PC. More specifically, the present invention relates to a tablet PC accommodating device having a built-in supporting mechanism for adjusting the viewing angle of the LCD panel thereof.

2. Description of the Prior Art

Tablet personal computer or tablet PC is known in the art. Compared to a conventional laptop computer, a tablet PC is more compact in size and is more portable, since the LCD monitor and the system main board of the tablet PC are integrated together. In use, the tablet PC usually needs two stands extending out from tablet computer system to prop the display panel toward a user. The stands support the weight of tablet computer system as well as additional force applied by a user when, for example, depressing buttons, or touching the touch screen in display panel. However, the stands add extra weight and volume to the tablet computer system, making it unwieldy. Another prior art design is that the stands are separated from the tablet PC. This also has a drawback in that the users need to carry and watch the stands all the time.

Consequently, a need exists for an improved tablet PC system configuration that overcomes the above-mentioned problems. Preferably, such device is highly mobile and ergonomically designed to be operated on users' laps or other variable work surfaces.

SUMMARY OF INVENTION

Accordingly, it is a primary objective of the present invention to provide an improved device for supporting and accommodating a tablet PC.

Another objective of the present invention is to provide a device for supporting and accommodating a tablet PC, which is capable of adjusting the viewing angle.

Still another objective of the present invention is to provide a device for supporting and accommodating a tablet PC, which is capable of stabilizing the tablet PC while it is moved.

Briefly summarized, the preferred embodiment of the present invention discloses a device for accommodating a tablet computer comprising a first sidewall plate and a second sidewall plate that is disposed corresponding to the first sidewall plate. The first sidewall plate and second sidewall plate define a space for accommodating the tablet computer. A supporting mechanism comprises a first pivot piece and a second pivot piece, both of which having one end being pivotally installed at an inner side of the first sidewall plate. The first pivot piece and second pivot piece rotate between a close position and an angled use position with respect to the first sidewall plate. When the first pivot piece and second pivot piece are in the angled use position, the second pivot piece is supported and positioned by the first pivot piece so that the second pivot piece can support the tablet PC.

Other objects, advantages, and novel features of the claimed invention will become more clearly and readily apparent from the following detailed description when taken in conjunction with the accompanying drawings.

DETAILED DESCRIPTION

Figure 1:
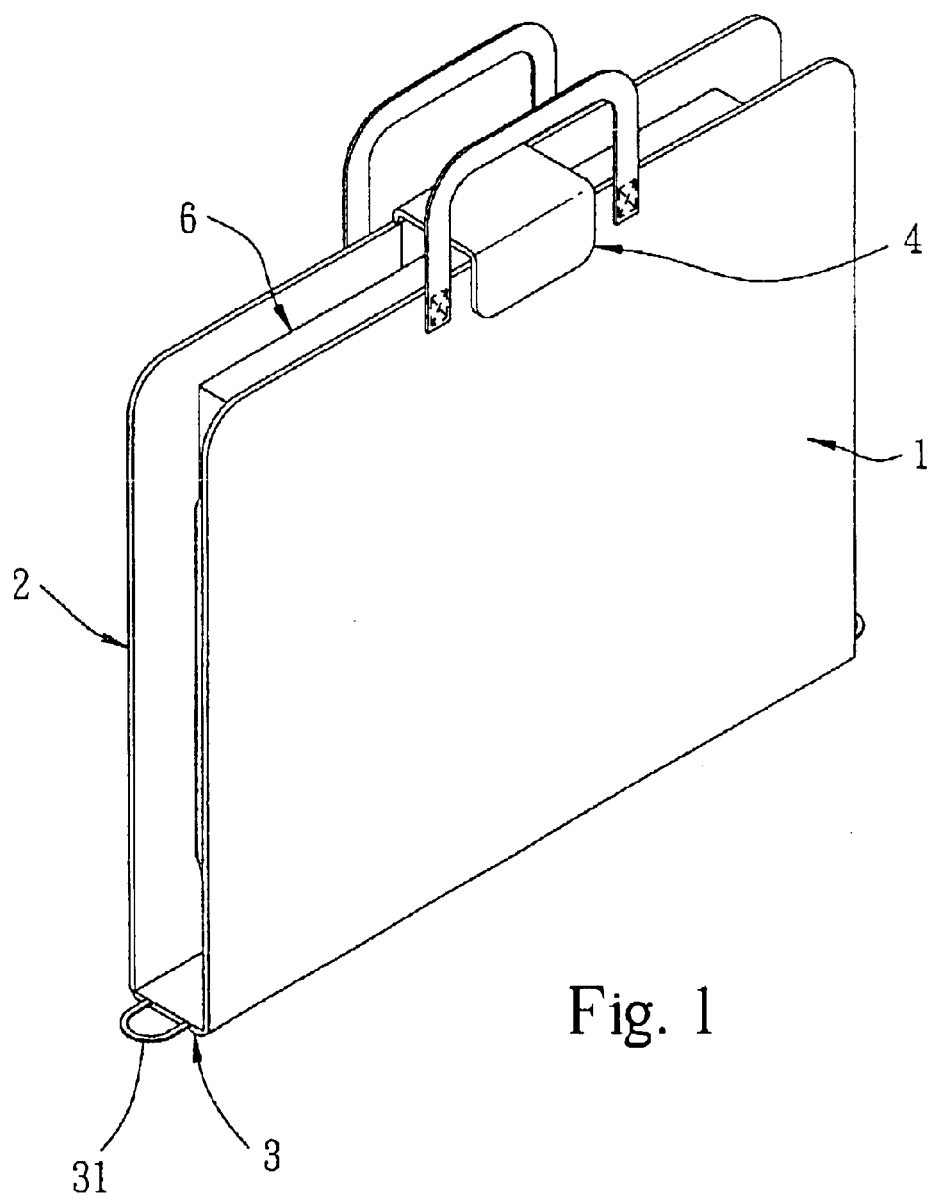
FIG. 1 is a perspective view of a device for accommodating a tablet PC according to one preferred embodiment of the present invention.
Figure 2:
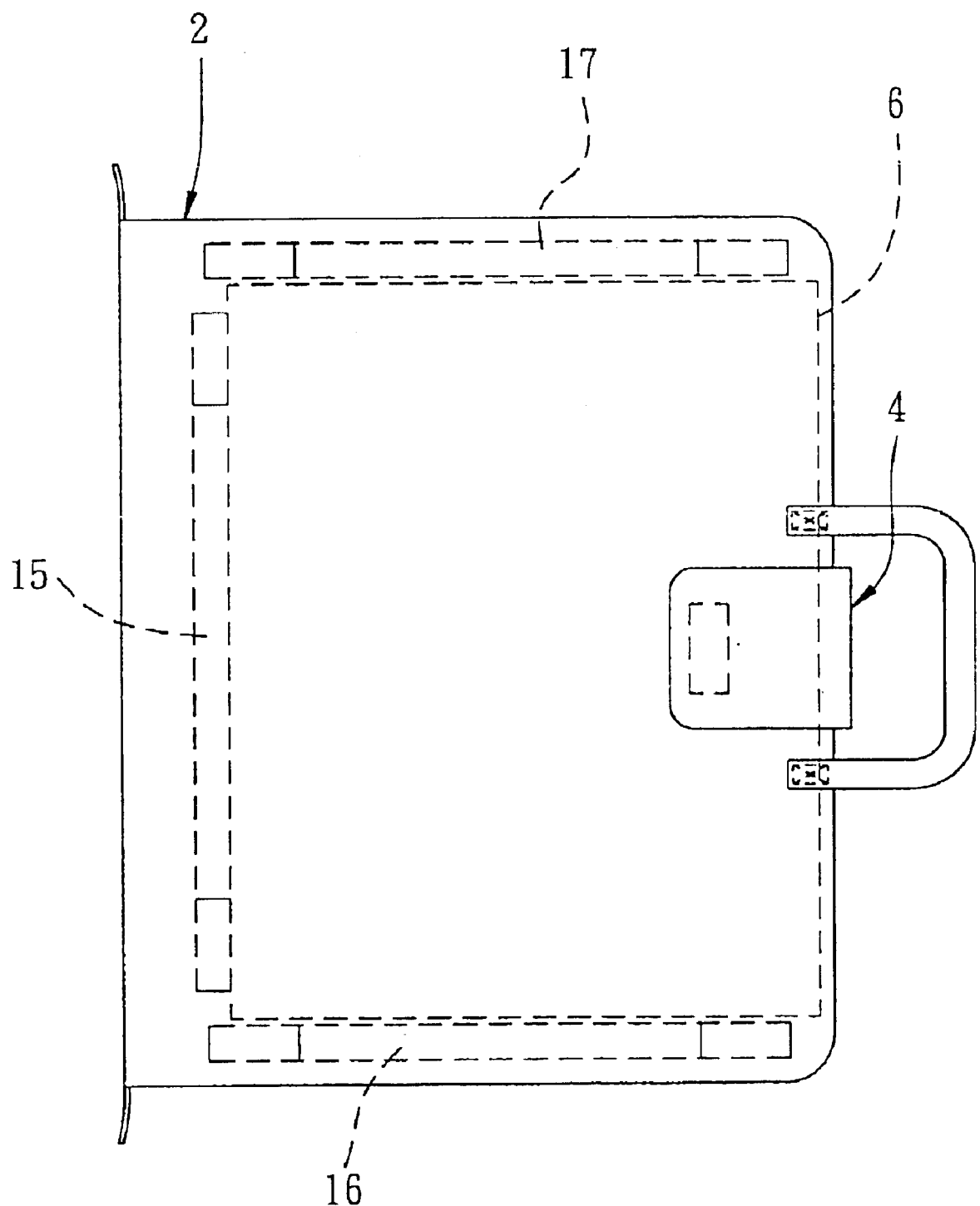
FIG. 2 is a side view of the device for accommodating a tablet PC as set forth in FIG. 1 showing the protrusion strips according to one preferred embodiment of the present invention.
Figure 5:
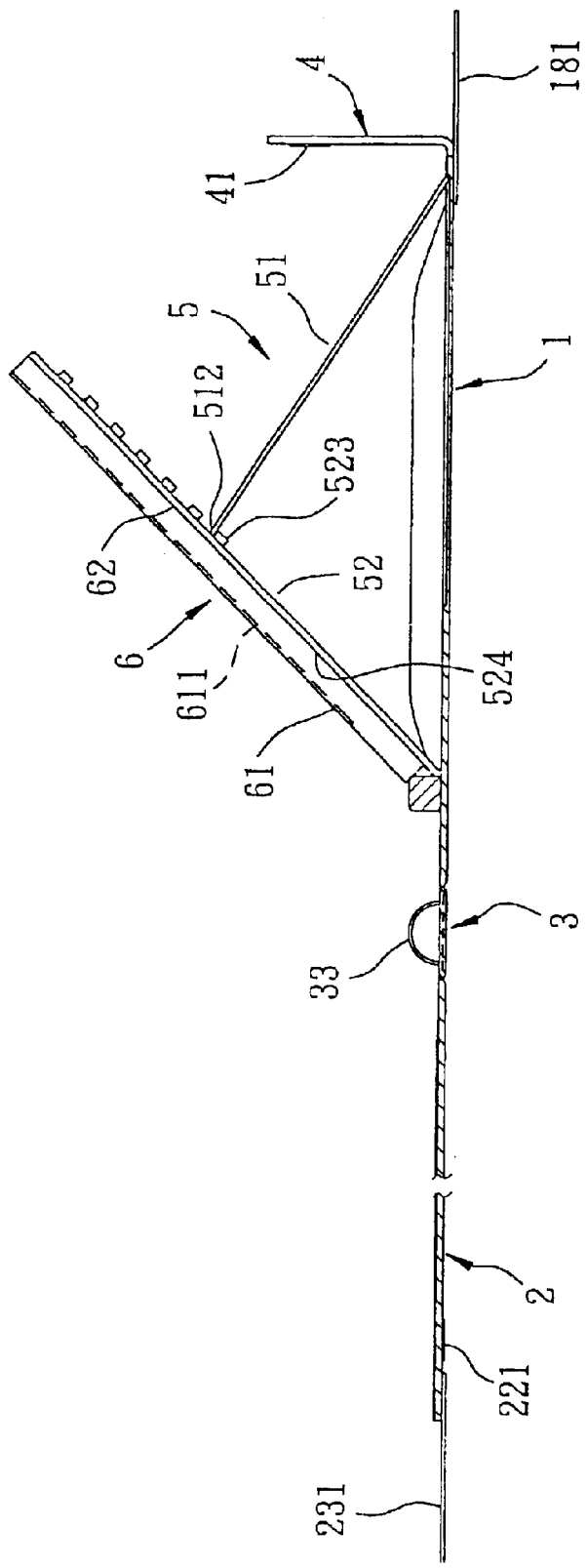
FIG. 5 is a side view of the device for accommodating a tablet PC of FIG. 4.

Please refer to FIG. 1 and FIG. 5. A device for accommodating a tablet PC 6 in accordance with the preferred embodiment of the present invention is illustrated. The device comprises a first sidewall plate 1, a second sidewall plate 2, a bottom portion 3, a joint member 4, and a supporting member 5. The tablet PC 6 comprises a front side 61 on which a liquid crystal display (LCD) panel 611 is disposed, and a backside 62 opposite to the front side 61.

Figure 3:
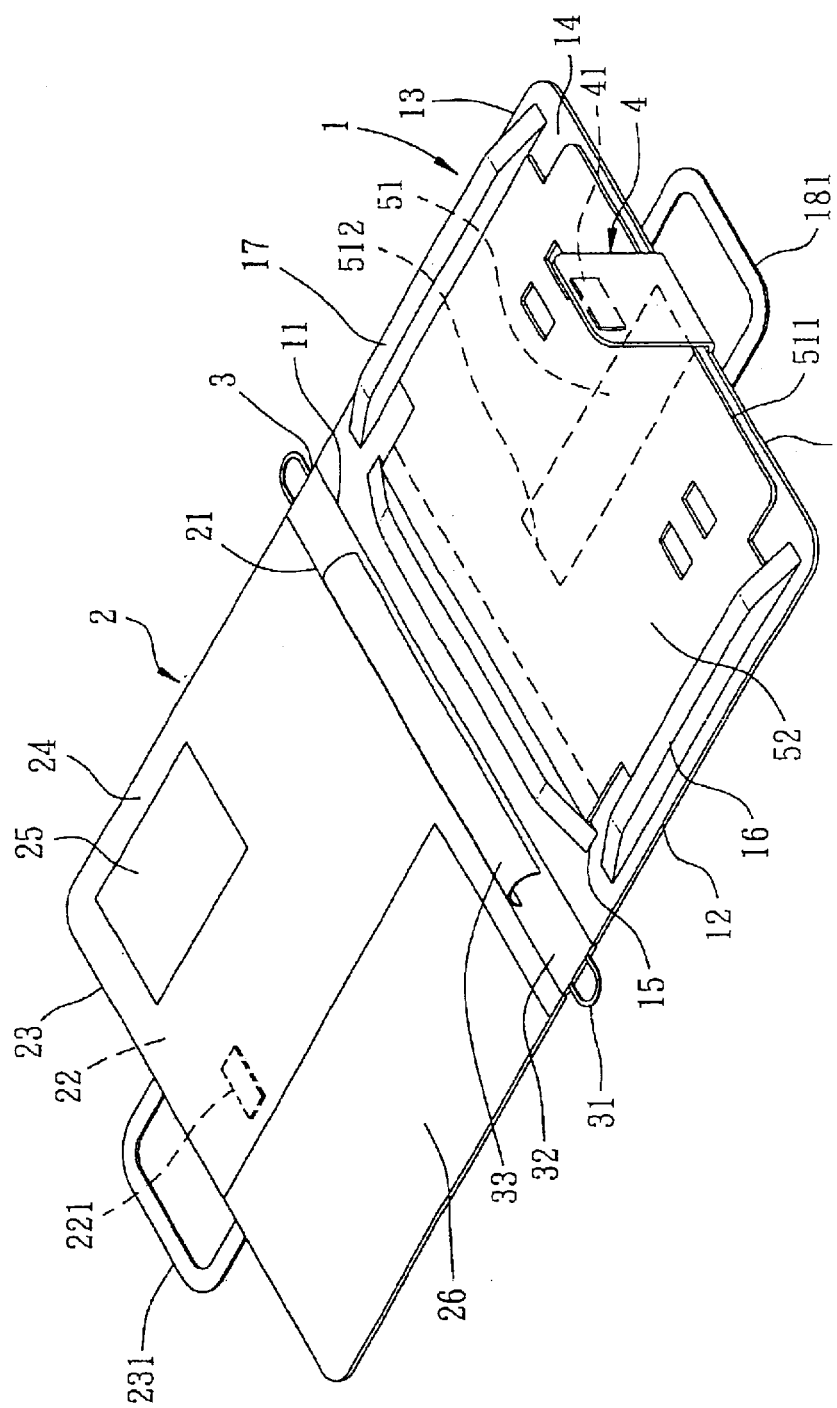
FIG. 3 is a perspective view of the device for accommodating a tablet PC when it is spread wide open according to one preferred embodiment of the present invention.

Please refer to FIG. 1 and FIG. 3. Typically, the first sidewall plate 1 and the second sidewall plate 2 are similar in shapes such as a rectangular shape corresponding to the dimension of the tablet PC 6. A lower side 11 of the first sidewall plate 1 and a lower side 21 of the second sidewall plate 2 are connected to the rectangular bottom portion 3 in a foldable manner. Using the lower sides 11 and 12 as pivots, the first sidewall plate 1 and the second sidewall plate 2 can be oriented to become an close position as set forth in FIG. 1. In FIG. 1, the first sidewall plate 1 and the second sidewall plate 2 define a space for accommodating the tablet PC 6. Alternatively, the device can be spread to become an open state as set forth in FIG. 3, such that the tablet PC can be easily taken out from the device or supported by the device.

As shown in FIG. 3, three protrusion strips 15, 16, and 17 are provided on the inner surface 14 along the length of the lower side 11 of the first sidewall plate 1 and along the lengths of the two opposite sides 12 and 13 adjacent to the lower side 11 of the first sidewall plate 1. The area surrounded by the three protrusion strips 15, 16, and 17 has a rectangular shape that is substantially equal to the dimension of the tablet PC 6. By means of the three protrusion strips 15, 16, and 17, the tablet PC 6 is restrained during moving without the fear of falling out. Each of the three protrusion strips 15, 16, and 17 has slant ends for increasing comfort when a user leans his or her hands thereon. In addition, the cross-section of each of the protrusion strips 16 and 17 on respective sides 12 and 13 may be reverse L-shaped to further restrict the tablet PC 6.

The joint member 4 may be an elongated strip having one distal end tightly fastened to the side 18 opposite to the lower side 11 of the first sidewall plate 1. A first adhesion portion 41 is located on an inner side of the other end of the joint member 4. When the first sidewall plate 1 and the second sidewall plate 2 are in a close position, the first adhesion portion 41 moveably sticks to a second adhesion portion 221 on outer side 22 of the second sidewall plate 2. The joint member 4, together with the three protrusion strips 15, 16, and 17, limit and stabilize the tablet PC 6 therein. It is appreciated that the joint member 4 may have both ends that are detachable from respective first sidewall plate 1 and second sidewall plate 2 using buckling means or the like.

A pair of handles 181 and 231 is disposed on sides 18 and 23 of the first sidewall plate 1 and the second sidewall plate 2, respectively. A pair of buckling rings 31 is disposed on opposite ends of the bottom portion 3. A belt (not shown) is buckled to the pair of buckling rings 31. It is the subsidiary function of the present invention that a pen sleeve 33 may be disposed on the inner side of the bottom portion 3 and a pocket for business cards and a document stiffener 26 may be disposed on the inner surface 24 of the second sidewall plate 2. By providing these elements, the device for accommodating the tablet PC of the present invention also functions somewhat like a briefcase.

Figure 4:
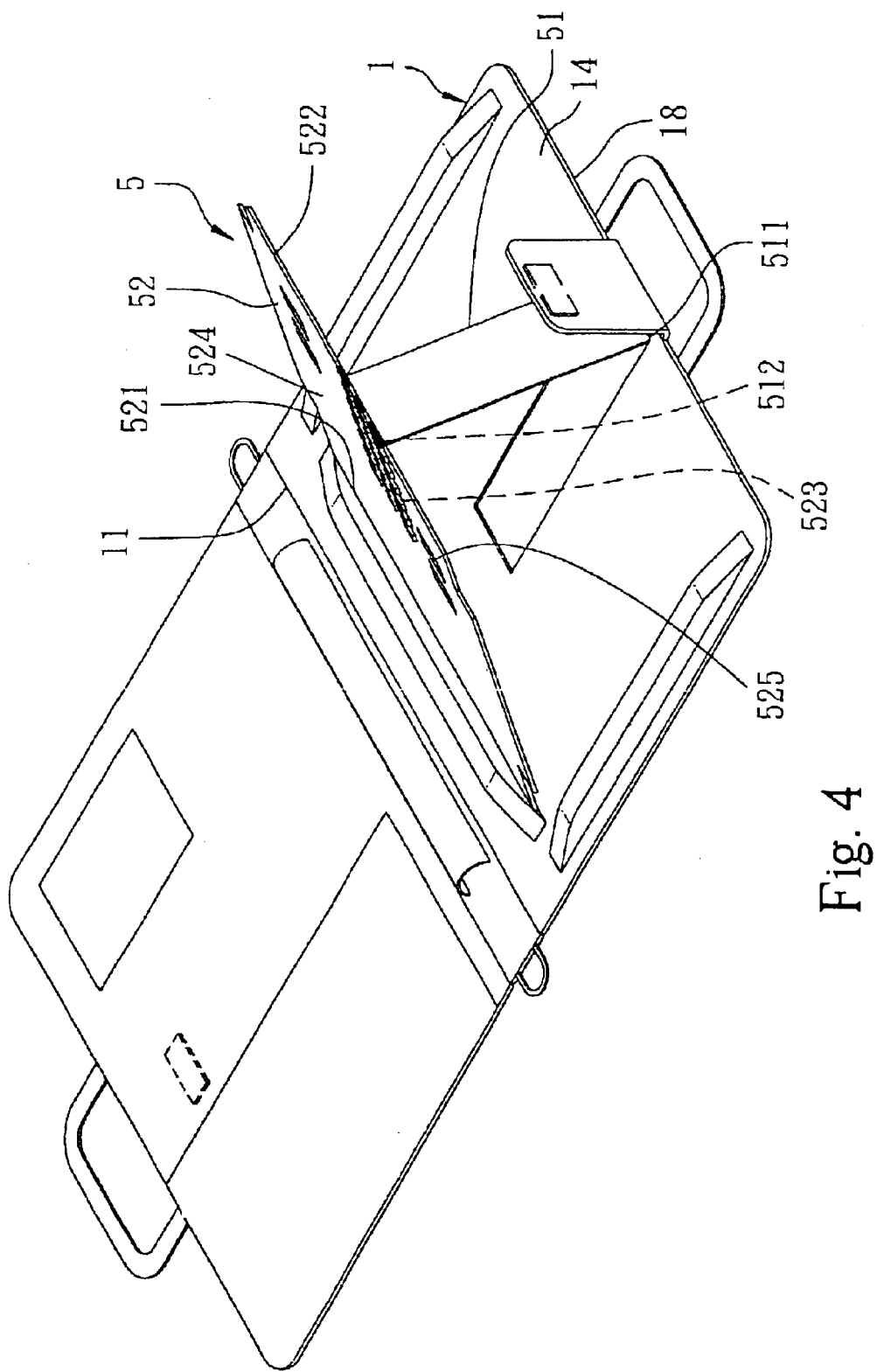
FIG. 4 is a perspective view of the device for accommodating a tablet PC when it is in a use position according to one preferred embodiment of the present invention.

Please refer to FIG. 3 to FIG. 5. The supporting member 5 includes a first pivot piece 51 that is pivotally installed in the inner surface 14 of the first sidewall plate 1 and a second pivot piece 52. The first pivot piece 51 is an elongated strip comprising a pivot end 511 pivotally connected to the lower portion of the inner surface 14 close to the side 18 of the first sidewall plate 1, and a free end 512 opposite to the pivot end 511. As best seen in FIG. 3, preferably, the first pivot piece 51 is part of the first sidewall plate 1. The first pivot piece 51 may rotate between the close position as depicted in FIG. 3 and an angled position as depicted in FIG. 4 and FIG. 5.

According to the preferred embodiment, the second pivot piece 52 is a flat, rectangular plate body having a dimension that is substantially equal to the dimension of the tablet PC 6. The second pivot piece 52 comprises a pivot end 521 pivotally connected to the lower portion of the inner surface 14 close to the lower side 11 of the first sidewall plate 1, and a free end 522 opposite to the pivot end 521. The second pivot piece 52 may overlie the first pivot piece 51 and the first sidewall plate as shown in FIG. 3. The second pivot piece 52 can rotate between the close position as depicted in FIG. 3 and an angled position as depicted in FIG. 4 and FIG. 5. A plurality of space-apart positioning teeth 523 are disposed on the side, which faces the first pivot piece 51, near the center of the second pivot piece 52.

Please refer to FIG. 4 and FIG. 5. When the second pivot piece 52 is in a use position as shown in FIG. 4 and FIG. 5, one can raise the free end 512 of the first pivot piece 51 and use the edge of the free end 512 to lean against the plurality of positioning teeth, such that the second pivot piece 52 is adjusted to a comfortable angle. The second pivot piece 52 provides a flat surface 524 for placing the tablet PC 6. The backside 62 of the tablet PC 6 is supported by the flat surface 524 and the LCD panel 611 disposed on the front side 61 of the tablet PC 6 faces the user at an angle. Preferably, the flat surface 524 is a rough surface having sliding-proof patterns. A plurality of apertures 525 are provided on the second pivot piece 52. The heat generated from the tablet PC 6 is dissipated from the backside 62 of the tablet PC 6 to the surrounding atmosphere through the plurality of apertures 525. Preferably, the apertures 525 located at the positions corresponding to the heat dissipating openings (not shown) on the backside 62 of the tablet PC 6.

Of course, it is appreciated that the angle adjustment of the supporting member 5 can be accomplished by another means. For example, a conventional ratchet mechanism can be installed at the lower portion of the second pivot piece 52. In this case, the positioning teeth 523 are no longer necessary. The ratchet mechanism can provide angle positioning for the second pivot piece 52. The first pivot piece 51 is used to support the second pivot piece 52. Or, the conventional ratchet mechanism can be installed at the lower portion of the first pivot piece 51 to achieve the goal of adjusting viewing angle of the supporting member 5.

To sum up, the present invention pertains to a device for accommodating a tablet PC, which not only protects the tablet PC, but is easily to carry. A foldable supporting member 5 is installed therein for supporting the tablet PC at an angle. The main structure and the foldable supporting member 5 may be monolithic. No additional stands are needed. Furthermore, the plurality of positioning teeth 523 can provide the user with an optimal viewing angle. Moreover, the protrusion strips 15, 16, and 17 ensure the stability of the tablet PC 6 when it is moved.

Those skilled in the art will readily observe that numerous modifications and alterations of the present invention method may be made while retaining the teachings of the invention. Accordingly, the above disclosure should be construed as limited only by the metes and bounds of the appended claims.

What is claimed is:

1. A device for accommodating a tablet computer, comprising:

a first sidewall plate and a second sidewall plate that is disposed corresponding to the first sidewall plate, wherein the first sidewall plate and second sidewall plate define a space for accommodating the tablet computer; and a supporting mechanism comprising a first pivot piece and a second pivot piece, both of which having one end being pivotally installed at one side of the first sidewall plate, wherein the second pivot piece provides a flat surface for supporting backside of the tablet computer and the second pivot piece has at least one aperture disposed corresponding to a heat dissipating opening on the backside of the tablet computer, whereby heat generated by the tablet computer is dissipated through the aperture, wherein the first pivot piece and second pivot piece rotate between a close position and an angled use position with respect to the first sidewall plate, and wherein when the first pivot piece and second pivot piece are in the angled use position, the second pivot piece is supported and positioned by the first pivot piece so that the second pivot piece can support the tablet computer.

2. The device for accommodating a tablet computer as claimed in claim 1 wherein the angled use position situated by the first pivot piece and second pivot piece is adjustable.

3. The device for accommodating a tablet computer as claimed in claim 2 wherein the second pivot piece comprises a plurality of space-apart positioning teeth disposed on one side close to the first pivot piece, and the first pivot piece selectively leans against the positioning teeth to adjust a viewing angel.

4. The device for accommodating a tablet computer as claimed in claim 1 wherein the flat surface of the second pivot piece is sliding-proof.

5. The device for accommodating a tablet computer as claimed in claim 1 further comprising a bottom portion connecting to the first sidewall plate and the second sidewall plate, and wherein the first sidewall plate and the second sidewall plate use two opposite sides of the bottom portion as pivots to rotate to the close position or the angled use position.

6. The device for accommodating a tablet computer as claimed in claim 5 wherein a pair of handles is disposed on two corresponding sides of the first sidewall plate and the second sidewall plate.

7. The device for accommodating a tablet computer as claimed in claim 5 wherein a pocket for business cards is provided at an inner side of the second sidewall plate.

8. The device for accommodating a tablet computer as claimed in claim 5 wherein a document stiffener is provided at an inner side of the second sidewall plate.

9. The device for accommodating a tablet computer as claimed in claim 5 further comprising a joint member that fixes the first sidewall plate and the second sidewall plate in the close position.

10. The device for accommodating a tablet computer as claimed in claims 1 wherein the first sidewall plate is rectangular, and wherein three protrusion strips are provided on respective three sides of the first sidewall plate, the protrusion strips are used to restrain the tablet computer.

11. The device for accommodating a tablet computer as claimed in claim 10 wherein each of the three protrusion strips has two slant ends for increasing comfort when a user leans his or her hands thereon.

12. The device for accommodating a tablet computer as claimed in claim 10 wherein each of the protrusion strips on respective sides has a reverse L-shaped cross section to further restrict the tablet computer.

13. A device for accommodating a tablet computer, comprising:
- a first sidewall plate and a second sidewall plate that is disposed corresponding to the first sidewall plate, wherein the first sidewall plate and second sidewall plate define a space for accommodating the tablet computer; and
- a supporting mechanism comprising a supporting strip and a supporting plate for placing the tablet computer at a suitable viewing angle, wherein the supporting strip, which is part of the first sidewall plate, includes a first pivot end pivotally connected to a first side of the first sidewall plate and a first free end, while the supporting plate includes a second pivot end pivotally connected to a second side that is opposite to the first side of the first sidewall plate and a second free end, and wherein the supporting plate is supported and positioned by the supporting strip.

* * * * *